US008355456B2

(12) United States Patent
Tamaki et al.

(10) Patent No.: US 8,355,456 B2
(45) Date of Patent: Jan. 15, 2013

(54) TRANSMITTING DEVICE, RECEIVING DEVICE, AND SIGNAL PROCESSING METHOD IN RADIO COMMUNICATION SYSTEM

(75) Inventors: Satoshi Tamaki, Kokubunji (JP); Takashi Yano, Tokorozawa (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 12/836,149

(22) Filed: Jul. 14, 2010

(65) Prior Publication Data

US 2011/0013714 A1 Jan. 20, 2011

(30) Foreign Application Priority Data

Jul. 15, 2009 (JP) ................... 2009-166722

(51) Int. Cl.
*H04K 1/10* (2006.01)

(52) U.S. Cl. ...................................... 375/260

(58) Field of Classification Search .................. 375/260; 455/207, 209, 313, 314, 315
See application file for complete search history.

(56) References Cited

U.S. PATENT DOCUMENTS

| 7,423,959 | B2 * | 9/2008 | Gavillero et al. ............. 370/208 |
| 2007/0098065 | A1 * | 5/2007 | Ashish ..................... 375/240.03 |
| 2007/0230328 | A1 | 10/2007 | Saitou |
| 2008/0130779 | A1 * | 6/2008 | Levi et al. ..................... 375/267 |
| 2009/0086866 | A1 * | 4/2009 | Boppana et al. ............. 375/350 |

FOREIGN PATENT DOCUMENTS

JP 2007-274048 10/2007

* cited by examiner

*Primary Examiner* — Kevin Kim
(74) *Attorney, Agent, or Firm* — Antonelli, Terry, Stout & Kraus, LLP.

(57) ABSTRACT

A signal frequency of an interface signal between a baseband unit and a remote radio unit is decreased by downsampling, and the strain of the signal caused by downsampling is compensated for each subcarrier before an IFFT during transmission, and after FFT during reception.

13 Claims, 9 Drawing Sheets

TRANSMITTING DEVICE, RECEIVING DEVICE, AND SIGNAL PROCESSING METHOD IN RADIO COMMUNICATION SYSTEM

CLAIM OF PRIORITY

The present application claims priority from Japanese patent application JP 2009-166722 filed on Jul. 15, 2009, the content of which is hereby incorporated by reference into this application.

FIELD OF THE INVENTION

The present invention relates to a radio communication system including a transmitting device (Tx) and a receiving device (Rx).

In particular, the present invention relates to a signal transmission system for transmitting a signal between processors and a communication device that realizes the signal transmission system, in a radio communication system that produces a communication signal in a time domain by means of orthogonal transform, particularly in a radio communication system using an orthogonal frequency division multiplexing system.

BACKGROUND OF THE INVENTION

With the wider band of a radio communication, multicarrier communication systems that divide Tx information into a plurality of frequency bands (hereinafter referred to as "subcarriers") to conduct a communication are used. Among the multicarrier communication systems, an orthogonal frequency division multiplexing (OFDM) system narrows the bandwidth of each subcarrier to improve a resistance to a delay wave, and uses the orthogonality of a signal to render a guard band between the subcarriers unnecessary, thereby enabling a high-frequency use efficiency to be realized. Therefore, the OFDM system is applied in a wide range of systems such as worldwide interoperability of microwave access (WiMAX) or long term evolution (LTE).

In each radio device of those systems, particularly in a base station device that conducts a communication with a large number of terminal devices, it is desirable to aggregate signal processing in the neighborhood of an antenna in order to prevent attenuation of a signal within the base station device. On the other hand, the scale of the device that can be arranged in the neighborhood of the antenna is limited, and according to a requirement of dealing with a communication technology using a plurality of antennas located at distances from each other, there is used a radio device having a remote radio unit arranged in the neighborhood of each antenna, and a baseband unit additionally arranged, in which those units are connected by a digital signal.

Because the radio device having the above configuration is normally used, for example, in CPRI Specification V4.0, Common Public Radio Interface (CPRI); Interface Specification, issued on Jun. 30, 2008, an interface between the baseband unit called "radio equipment control" and the remote radio unit called "radio equipment" is defined as standard.

Also, apart from the interface disclosed in CPRI Specification V4.0, Common Public Radio Interface (CPRI); Interface Specification, issued on Jun. 30, 2008, for example, JP-A-2007-274048 discloses a technique in which the baseband unit called "baseband processor" and the remote radio unit called "radio unit" are interfaced in a frequency domain.

SUMMARY OF THE INVENTION

When the remote radio unit and the baseband unit are connected by the digital signal, the interface increases in required signal volume in proportion to the bandwidth of a signal, the dynamic range of the signal, or the number of antennas. From the requirement of improving a communication speed, the bandwidth of the signal is more widened as the generation of the radio communication is more advanced. At the same time, the dynamic range of the signal is more extended as the generation of the radio communication is more advanced due to an increase in the number of multiple users who conduct a communication at the same time, or the application of a multilevel modulation technique such as 16 quadrature amplitude modulation (16QAM). Further, the number of required antennas is also increased by application of a spatial multiplex technique and an interference reduction technique such as a multiple input multiple output (MIMO) or a smart antenna.

As described above, the signal volume between the remote radio unit and the baseband unit goes on increasing, and a demand is made to reduce the signal volume.

Generally, the radio communication system has such a property that the signal volume more increases as the signal more approaches the antenna end from a wired section due to the redundancy of information to be communicated or the addition of a control signal, and due to the conversion of a signal format for reducing the deterioration of a signal quality in a radio section. For that reason, the signal volume between those units can be more reduced as the signal processing which is conducted by the baseband unit is more decreased, and the signal processing which is conducted by the remote radio unit is more increased. However, from the viewpoint of such a limited placement area that the remote radio unit needs to be in the neighborhood of the antenna, it is difficult to increase the device scale as compared with the baseband unit. This leads to such a problem that the digital signal processing should be reduced in the remote radio unit as much as possible.

An object of the present invention is to provide a method of reducing an interface signal volume between a baseband unit and a remote radio unit while suppressing the deterioration of a signal quality and an increase in a signal processing scale, particularly, in the remote radio unit, and a radio device using the method.

In order to achieve the above object, according to one aspect of the present invention, there is provided a radio communication system that generates a transmit signal on the time axis from a transmit signal in each subcarrier such as OFDM by orthogonal transform, comprising: a first frequency transform process that decreases a frequency of the signal on the time axis; and a second frequency transform process that increases the frequency of the signal that is subjected to the first frequency transform, wherein characteristic compensation of the first frequency transform process and the second frequency transform process is conducted for each subcarrier by using the inverse transform results of the orthogonal transform to impulse responses of the first frequency transform process and the second frequency transform process.

According to another aspect of the present invention, there is provided a method of reducing an interface signal volume between a baseband unit and a remote radio unit while suppressing the deterioration of a signal quality and an increase in a signal processing scale, particularly, in the remote radio unit, and a radio device using the method.

DETAILED DESCRIPTION OF THE PREFERRED EMBODIMENTS

Figure 1:
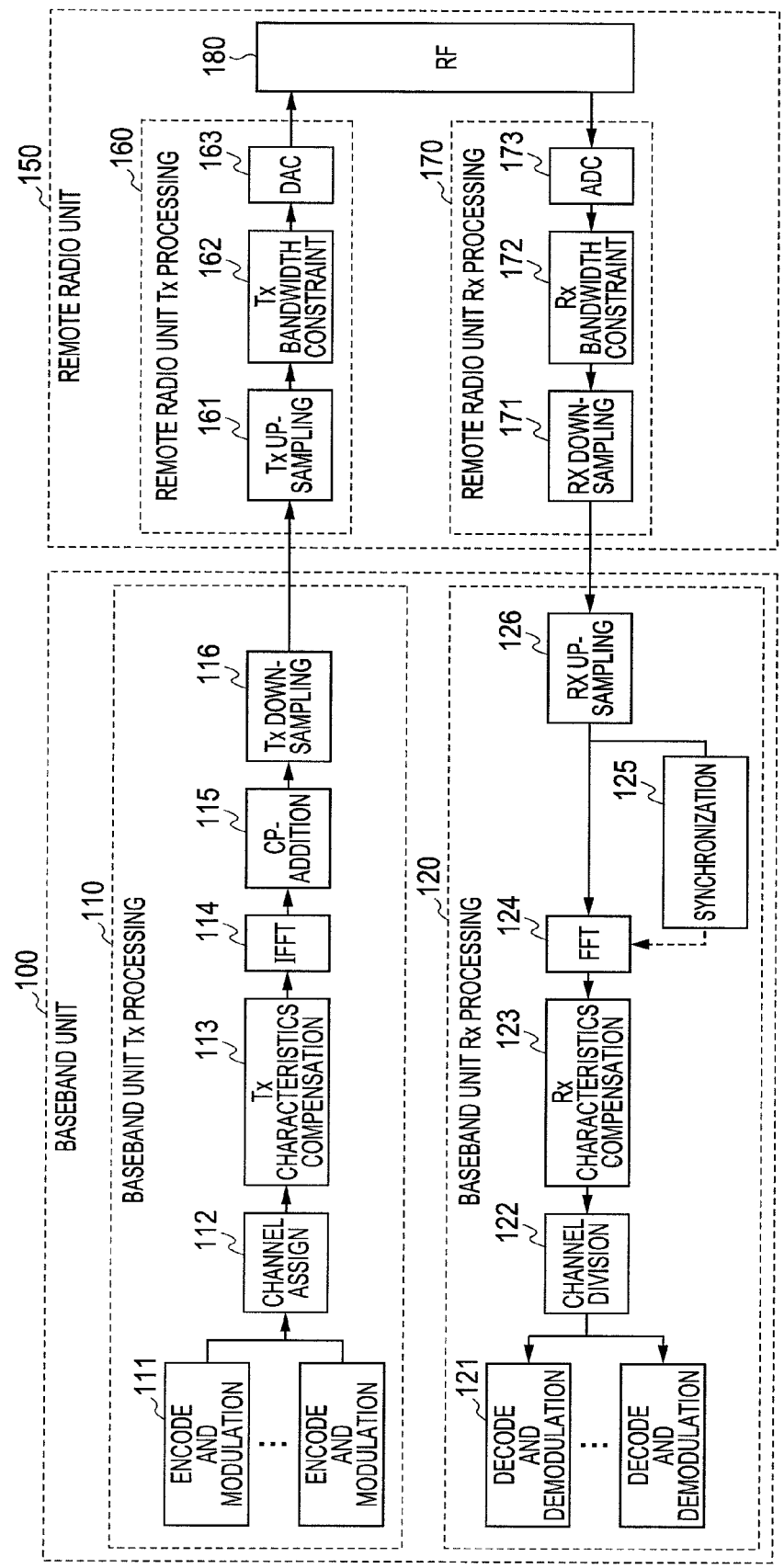
FIG. 1 is a block diagram illustrating an example of signal processing in a radio station.

Hereinafter, embodiments of the present invention will be described with reference to the accompanying drawings.

Referring to the drawings, a description will be given of an example in which both of a Tx signal to a radio communication terminal and a Rx signal from the radio communication terminal are applied to a base station. Also, the present invention can be applied to only the Tx signal whereas a conventional method can be used for the Rx signal. Further, the present invention can be applied to only the Rx signal whereas the conventional method can be used for the Tx signal. Still further, this embodiment can be applied to at least one of processing the Tx signal to the base station and processing the Rx signal from the base station by a radio communication terminal.

Also, in the embodiment of the present invention, an OFDM system in which the respective subcarriers are arranged in frequencies orthogonal by a symbol unit by the aid of an FFT (fast Fourier transform) mainly as the orthogonal transform will be described below mainly as orthogonal transform. However, the present invention is not limited to the OFDM system, but can be applied to any radio communication system which produces a communication signal in a time domain by using the orthogonal transform.

For simplification, in the following description, the FFT points and the number of subcarriers used in the OFDM system are limited to, for example, 32 and 18 in the drawings, respectively. However, the present invention is not limited to the FFT points and the number of subcarriers, but can be applied to a system having any FFT points and any number of subcarriers.

The configuration of a radio station according to a first embodiment of the present invention will be described with reference to the accompanying drawings.

FIG. 1 is a block diagram showing signal processing in a radio station according to this embodiment.

In a baseband unit Tx processing part 110, each of encode and modulation parts 111 conducts encoding processing and modulating processing on Tx information to produce Tx channel information, and outputs the Tx channel information to a channel assignment part 112.

The channel allocation section 112 receives signals output from one or plural encode and modulation parts 111 to multiplex the signals, and allocates the respective multiplexed signals to respective times and respective subcarriers, and outputs the allocation result to a Tx characteristic compensation part 113.

The Tx characteristic compensation part 113 receives an output signal from the channel assignment part 112, and multiplies the signal by a coefficient in each of the subcarriers to output the multiplied signal to an IFFT part 114.

The IFFT part 114 receives the output signal from the Tx characteristic compensation part 113, conducts IFFT (inverse fast Fourier transform) processing to produce a signal in the time domain, and outputs the signal to a CP addition part 115.

The CP addition part 115 receives the output signal from the IFFT part 114, conducts a CP adding process, and outputs the added result to a Tx down-sampling part 116. The CP adding process is a process for inserting a signal called "guard interval 520" or "cyclic prefix" at the head of the time domain signal after IFFT calculation on an IFFT signal processing basis 510 as shown in a schematic diagram of FIG. 5, and the signal to be inserted is produced by copying a part 530 of the ending of the time domain signal after the IFFT calculation.

The Tx down-sampling part 116 receives an output signal from the CP addition part 115, down-samples the signal to transform the frequency of the signal, and thereafter outputs a signal as an output signal of the baseband unit Tx processing part 110.

In a remote radio unit Tx processing part 160, a Tx up-sampling part 161 up-samples a signal input to the remote radio unit Tx processing part 160 to transform the frequency of the signal, and thereafter outputs a signal to a Tx bandwidth constraint part 162.

The Tx bandwidth constraint part 162 receives the output signal from the Tx up-sampling part 161, limits the band of the signal by means of, for example, an FIR (Finite Impulse Response) filter, and thereafter outputs a signal to a DAC unit 163.

The DAC unit 163 receives an output signal from the Tx bandwidth constraint part 162, conducts D/A conversion on the signal to produce an analog signal, and outputs a signal to an RF unit 180 as an output signal of the remote radio unit Tx processing part 160.

The RF unit 180 receives an output signal from the remote radio unit Tx processing part 160, subjects the signal to processing such as signal frequency transform into a radio frequency and amplification, and transmits a radio signal through an antenna. Meanwhile, the RF unit 180 receives the radio signal through the antenna, subjects the radio signal to processing such as amplification and signal frequency transform into a baseband frequency, and outputs the signal to a remote radio unit Rx processing part 170.

In the remote radio unit Rx processing part 170, an ADC unit 173 receives an output signal from the RF unit 180, conducts A/D conversion on the signal to produce a digital signal, and outputs the digital signal to a Rx bandwidth constraint part 172.

The Rx bandwidth constraint part 172 receives an output signal from the ADC unit 173, limits the band of the signal by means of, for example, an FIR filter, and thereafter outputs a signal to the Rx down-sampling part 171.

The Rx down-sampling part 171 receives an output signal from the Rx bandwidth constraint part 172, down-samples the signal to transform the frequency of the signal, and thereafter outputs the transformed signal as an output signal of the remote radio unit Rx processing part 170.

In a baseband unit Rx processing part 120, a Rx up-sampling part 126 up-samples an input signal to the baseband unit Rx processing part 120 to transform the frequency of the signal, and thereafter outputs the transformed signal to a synchronization part 125 and an FFT part 124.

The synchronization part 125 outputs the output signal from the Rx up-sampling part 126, and extracts an FFT window timing from the signal to output the extracted FFT window timing to the FFT part 124. As a method of extracting the FFT window timing, there is, for example, a method in which an impulse response of a propagation path is obtained, and timing at which the impulse response becomes maximum within a given time range is set as FFT window timing. As a method of obtaining the impulse response of the propagation path, there is, for example, a method in which there is used, as a coefficient, matched filter with a pattern having a relationship of a complex conjugation with a fixed pattern included in the receive signal. Alternatively, as a method of extracting the FFT window timing, there is a method in which the moving average deviation of a correlation value between a receive signal and a complex conjugation of a signal obtained by delaying the receive signal by a given period of time is obtained, and timing at which the moving average deviation becomes maximum within a given time range is set as the FFT window timing.

The FFT part 124 receives an output signal from the Rx up-sampling part 126, conducts FFT processing on the signal at the FFT window timing which is an output of the synchronization part 125, and divides the signal in the time domain for each of the subcarriers to output the divided signals to a Rx characteristic compensation part 123.

The Rx characteristic compensation part 123 receives the output signals from the FFT part 124, and multiplies the signal by a coefficient in each of the subcarriers to output the multiplied signal to a channel division part 122.

The channel division part 122 receives the output signal from the Rx characteristic compensation part 123, and separates the signal for each of the subchannels to output Rx channel information to decode and demodulation parts 121. The channel division part 122 receives the output signal from the Rx characteristic compensation part 123, and separates the signal for each of the subchannels to output the separated signals to the decode and demodulation parts 121. The channel division part 122 also outputs information on a received pilot signal to the decode and demodulation parts 121 as received propagation path information.

Each of the decode and demodulation parts 121 receives the Rx channel information and the Rx propagation path information from the channel division part 122, and demodulates and decodes those information to produce Rx information.

Figure 2:
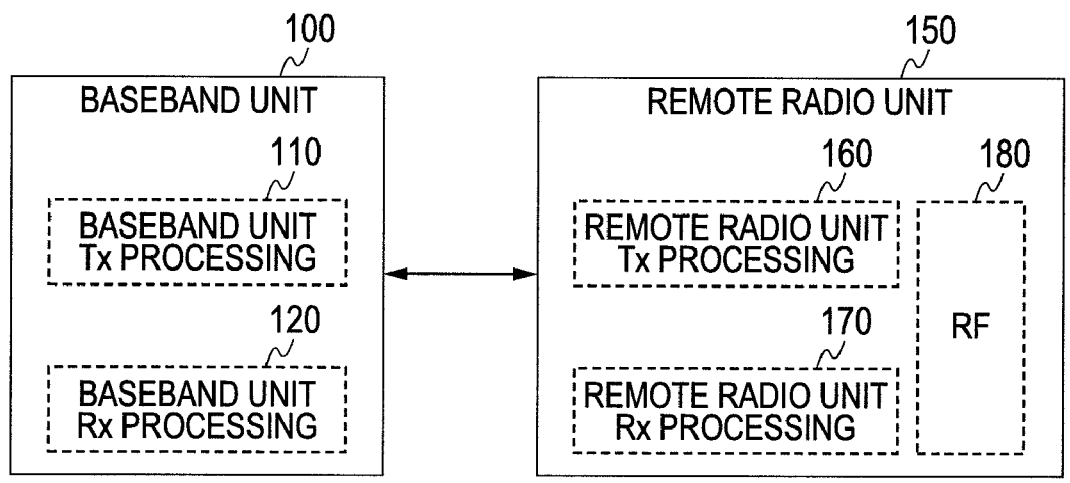
FIG. 2 is a block diagram illustrating an example of the connection between a baseband unit and a remote radio unit.

FIG. 2 is a block diagram illustrating an example of the connection between a baseband unit and a remote radio unit in a radio station according to this embodiment. As a typical configuration of the radio station in FIG. 1, the radio station has one baseband unit 100 and one remote radio unit 150.

The baseband unit 100 includes the baseband unit Tx processing part 110 and the baseband unit Rx processing part 120. The remote radio unit 150 includes a remote radio unit Tx processing part 160, the remote radio unit Rx processing part 170, and the RF unit 180. Each of the baseband unit Tx processing part 110 and the remote radio unit Tx processing part 160 conducts digital signal processing on information to be transmitted through a radio section. On the other hand, each of the baseband unit Rx processing part 120 and the remote radio unit Rx processing part 170 conducts digital signal processing on a signal received from the radio section. The RF unit 180 conducts analog signal processing on the information to be transmitted through the radio section and the signal received from the radio section.

Figure 3:
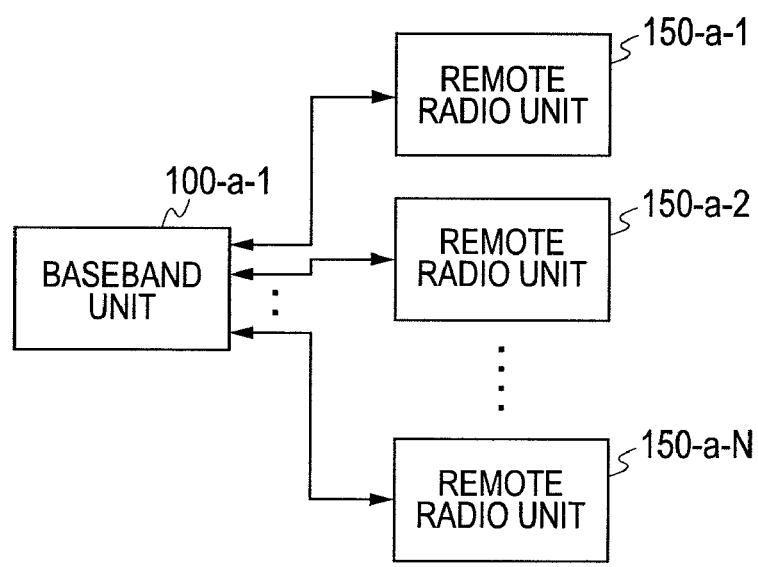
FIG. 3 is a block diagram illustrating another example of the connection of the baseband unit and the remote radio unit.

FIG. 3 is a block diagram illustrating another example of the connection of the baseband unit and the remote radio unit in the radio station according to this embodiment. In an example of FIG. 3, the radio station according to the present invention includes one baseband unit 100-*a*-1, and N remote radio units 150-*a*-1, 150-*a*-2, ..., 150-*a*-N. In the configuration of FIG. 3, each of the baseband unit Tx processing part and the baseband unit Rx processing part of the baseband unit 100-*a*-1 can be coupled with the plural remote radio units. Alternatively, the baseband unit 100-*a*-1 can include plural baseband unit Tx processing parts and plural baseband unit Rx processing parts, each of which is coupled with one remote radio unit.

Figure 4:
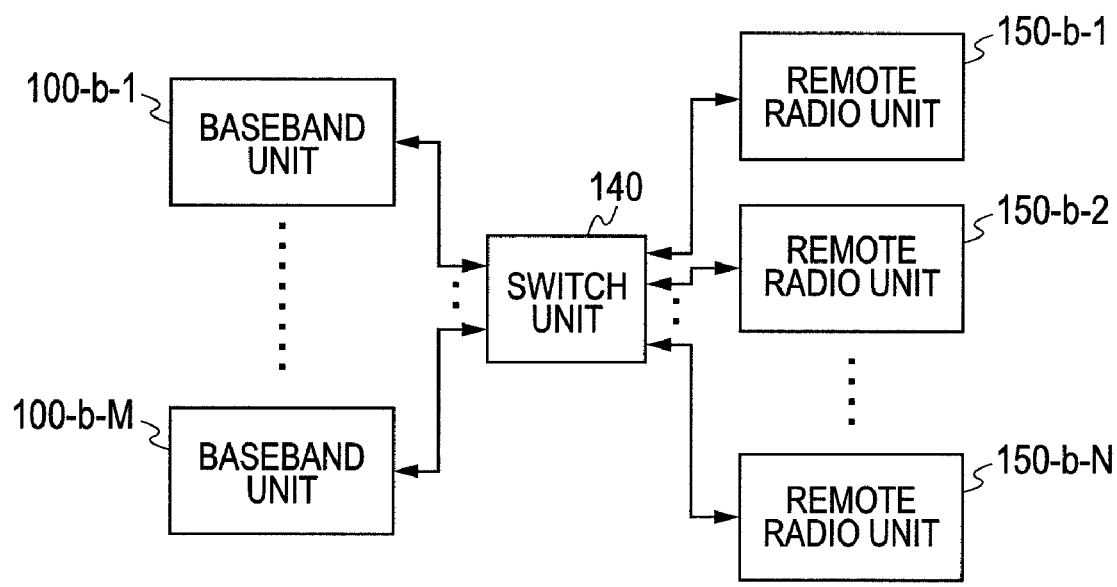
FIG. 4 is a block diagram illustrating still another example of the connection of the baseband unit and the remote radio unit.

FIG. 4 is a block diagram illustrating still another example of the connection of the baseband unit and the remote radio unit in the radio station according to this embodiment. In an example of FIG. 4, the radio station includes M baseband units 100-*b*-1, ..., 100-*b*-M, N remote radio units 150-*b*-1, 150-*b*-2, ..., 150-*b*-N, and a switch unit 140 that connects the baseband unit 100 and the remote radio unit 150.

In the configuration of FIG. 4, the baseband unit Tx processing part 110 and the baseband unit Rx processing part 120 within each of the baseband units, and the remote radio unit Tx processing part 160 and the remote radio unit Rx processing part 170 within each of the remote radio units are coupled with each other through the switch unit 140. A relationship between the baseband unit Tx processing parts 110 and the baseband unit Rx processing parts 120, which are connected to the switch unit 140, and the remote radio unit Tx processing parts 160 and the remote radio unit Rx processing parts 170, which are connected to the switch unit 140, can be fixed or changed over.

The baseband unit 100 and the remote radio unit 150 in the radio station according to this embodiment can have various coupling relationships, as exemplified above. For simplification, a case in which the baseband units 100 and the remote radio units 150 are coupled with each other on one-to-one as shown in FIG. 2 will be described in detail below. However, the same can be applied to other coupling relationships.

Figure 6:
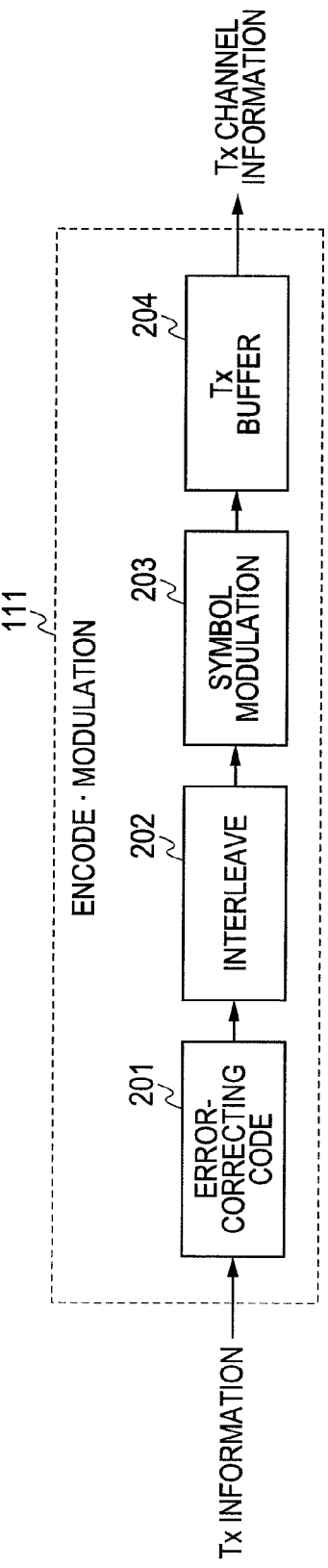
FIG. 6 is a block diagram illustrating an example of an encoding process and a modulating process.

FIG. 6 is a block diagram illustrating an example of an encoding process and a modulating process in the encode and modulation parts 111. The encode and modulation parts 111 includes an error-correcting code part 201, an interleaving part 202, a symbol modulation part 203, and a Tx buffer part 204. Each of the error-correcting code part 201, the interleaving part 202, the symbol modulation part 203, and the Tx buffer part 204 can allow a function thereof to be executed by program, or to be executed by a dedicated circuit.

The error-correcting code part 201 subjects the Tx information input to the encode and modulation parts 111 to error correction encoding by the aid of an error correction code, and outputs the Tx information that has been subjected to the error correction encoding to the interleaving part 202. As the error correction code, for example, a turbo code, a convolution code, a Reed-Solomon code, or an LDPC code is used.

The error-correcting code part 201 can add an error detection code such as a CRC to the Tx information that has not yet been subjected to error correction encoding. Also, for example, the error-correcting code part 201 can randomize the signal through an Exclusive-OR operation with a PN code before error correction encoding.

The interleaving part 202 interleaves a signal input from the error-correcting code part 201 for reordering a signal order, and outputs the interleaved signal to the symbol modulation part 203.

The symbol modulation part 203 modulates the signal input from the interleaving part 202 through a symbol modulation system such as BPSK, QPSK, 8PSK, or 16QAM, and outputs the modulated signal to the Tx buffer part 204. The Tx buffer part 204 accumulates the signals input from the symbol modulation part 203, and outputs Tx channel information according to information volume to be transmitted per unit time as an output signal of the encode and modulation parts 111.

The encode and modulation parts 111 can process plural blocks in parallel when producing, for example, a control signal channel and one or plural data signal channels, or when producing signals for plural users. Alternatively, the encode and modulation parts 111 can repetitively use one or plural blocks in time-division multiplex.

A part of the processing to be executed by the encode and modulation parts 111 can be conducted after the processing of the channel assignment part 112. For example, when the symbol modulating process is conducted after processing of the channel assignment part 112, the encode and modulation parts 111 adds information indicative of which symbol modulating process should be conducted to the Tx channel information instead of conducting processing corresponding to the symbol modulation part 203, and outputs the transit channel information to the channel assignment part 112. The encode and modulation parts 111 conducts the modulating process corresponding to the symbol modulation part 203 according to the information indicative of which symbol modulating process should be conducted after the processing of the channel assignment part 112.

Figure 7:
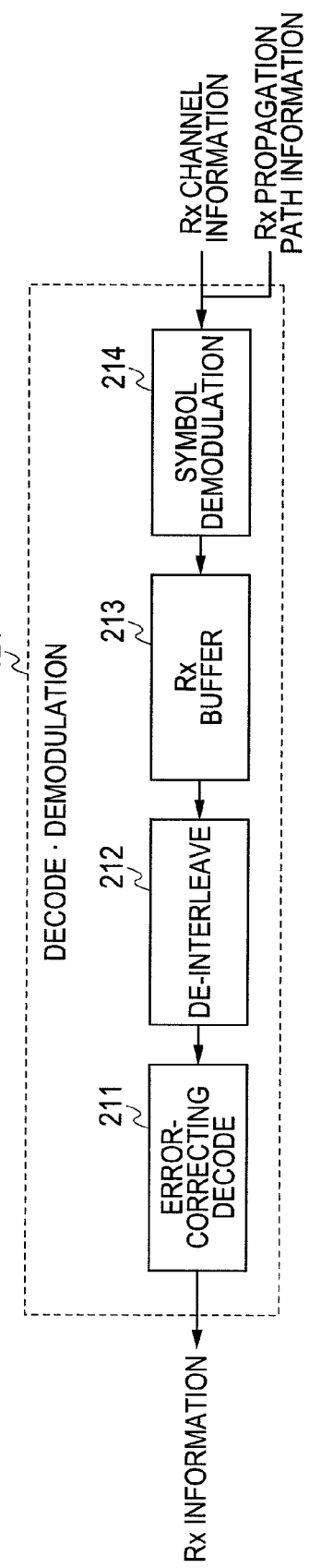
FIG. 7 is a block diagram illustrating an example of a demodulating process and a decoding process.

FIG. 7 is a block diagram illustrating the demodulating process and the decoding process in the decode and demodulation parts 121.

The decode and demodulation parts 121 include an error-correcting decode part 211, a deinterleaving part 212, a Rx buffer part 213, and a symbol demodulation part 214. Each of the error-correcting decode part 211, the deinterleaving part 212, the Rx buffer part 213, and the symbol demodulation part 214 can allow a function thereof to be executed by a program, or to be executed by a dedicated circuit.

The symbol demodulation part 214 estimates a variation in the amplitude and phase of the signal in the propagation path by the aid of the Rx propagation path information input to the decode and demodulation parts 121, and compensates the variation in the amplitude and phase of the Rx channel information. The symbol demodulation part 214 also demodulates the symbol modulated signal, and derives the likelihood for each bit to output the result to the Rx buffer part 213.

The Rx buffer part 213 receives the output signal from the symbol demodulation part 214, and accumulates the likelihoods after combining the likelihoods together with respect to the same bit likelihood, and outputs the result to the deinterleaving part 212 every encoding unit. The likelihood combination is represented by addition, for example, when a log likelihood ratio is used as the likelihood, which is an operation corresponding to a product of probability.

The deinterleaving part 212 conducts an interleaving process for reordering the signal order of the input signals, and outputs the result to the error-correcting decode part 211. As a method of reordering the signal order, there is used a reordering method of reordering the signal order to an inverse order of the interleaving process which is conducted during transmission to restore the order to an order before the interleaving process.

The error-correcting decode part 211 receives the output signal from the deinterleaving part 212, and decodes the error correction code used during transmission. When the randomizing process has been executed through the Exclusive-OR operation with the PN code before error correction encoding during transmission, the error-correcting decode part 211 cancels randomizing through the Exclusive OR operation with the same PN code after error correction decoding.

The decode and demodulation parts 121 can process plural blocks in parallel when producing, for example, a control signal channel and one or plural data signal channels, or when producing signals for plural users. Alternatively, the decode and demodulation parts 121 can repetitively conduct processing using one or plural blocks in time-division multiplex.

A part of the processing to be executed by the decode and demodulation parts 121 can be conducted before the processing of the channel division part 122. For example, when the symbol demodulating process is conducted before the processing of the channel division part 122, the decode and demodulation parts 121 does not conduct the processing corresponding to the symbol demodulation part 214. Meanwhile, before the processing of the channel division part 122, the decode and demodulation parts 121 extracts the information on the received pilot signal, and estimates and compensates a variation in the amplitude and phase of the signal in the propagation path in each of the subcarriers. The decode and demodulation parts 121 also conducts processing corresponding to the symbol demodulation part 214 that demodulates the symbol modulated signal, and deviates the likelihood for each bit.

In the synchronization part 125, the FFT window timing can be adjusted taking blur of the signal in the Rx down-sampling part 171 and the Rx up-sampling part 126 at the time of outputting the FFT window timing to the FFT part 124, into consideration. That is, for example, in the Rx down-sampling part 171, a signal having an S0 sample back and forth is used in order to determine a signal of a downsampling position, and in the Rx up-sampling part 126, a signal having an S1 sample back and forth is used in order to determine a signal of an upsampling position. In this case, a position delayed by S0+S1 sample can be output to the FFT part 124 as the FFT window timing. It is unnecessary that the adjustment amount of the FFT window timing is a value equal to S0+S1, and can be a value having a positive correlation with S0 and S1.

Figure 8:
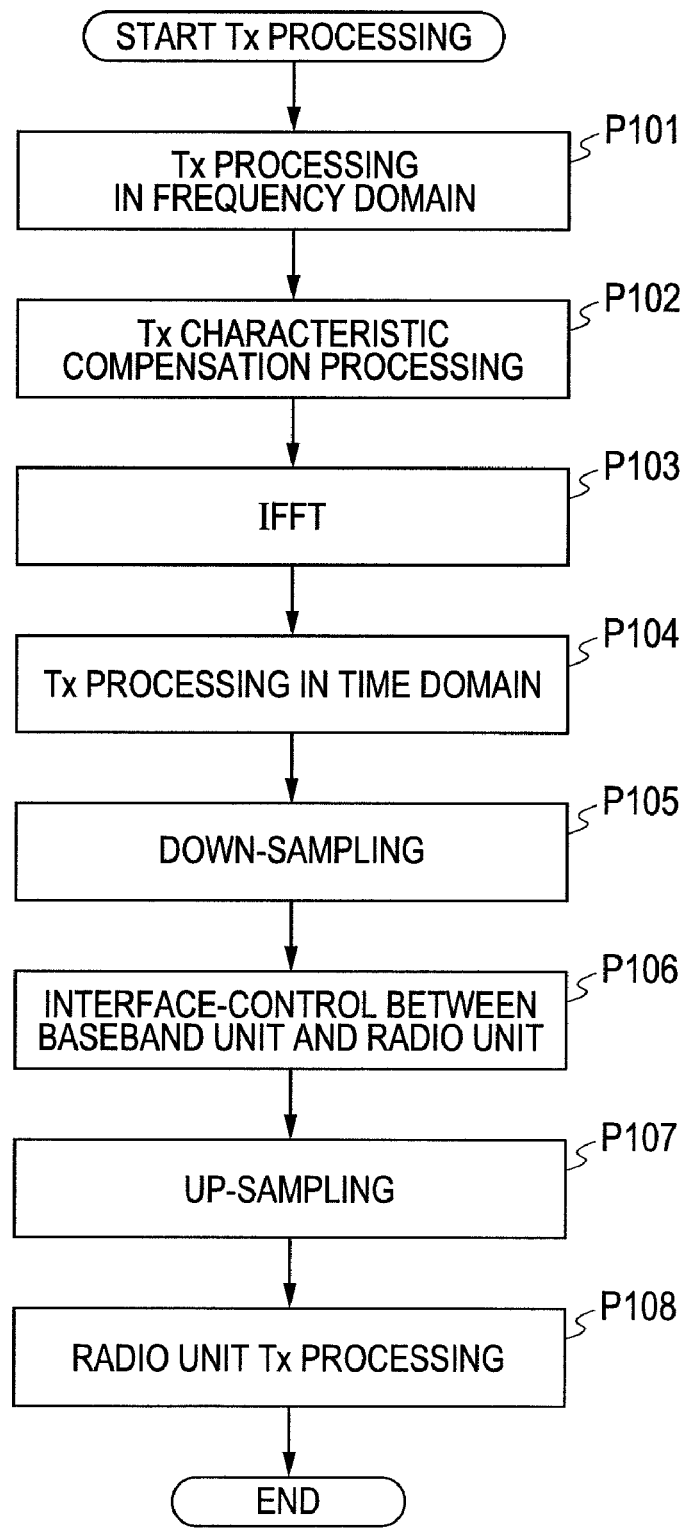
FIG. 8 is a flowchart illustrating an example of Tx signal processing.

FIG. 8 is a flowchart illustrating an example of Tx signal processing in the radio station according to this embodiment.

The baseband unit 100 processes a signal to be communicated in the stated order of Tx processing in frequency domain P101, Tx characteristic compensating processing P102, an IFFT P103, Tx processing in time domain P104, down-sampling P105, interface control between baseband and radio units P106, up-sampling P107, and radio unit Tx processing P108.

The Tx processing in frequency domain P101 is signal processing such as encoding or modulation in each subcarrier in the frequency domain. The Tx processing in frequency domain P101 is executed by the encode and modulation parts 111 and the channel assignment part 112 shown in FIG. 1. Although being called "frequency domain" in this specification, it is unnecessary that all of the processing is conducted strictly in the frequency domain. For example, there can be used an SC-FDMA system that produces the signal in the frequency domain by DFT after the encoding or modulating process has been conducted.

The Tx characteristic compensating processing P102 compensates the signal strain caused by the down-sampling P105 and the up-sampling P107 which will be described later, for example, multiplies the signals in each of the subcarriers. The Tx characteristic compensating processing P102 is executed by the Tx characteristic compensation part 113 shown in FIG. 2. The process of compensating the signal strain in the Tx characteristic compensating processing P102 will be described later.

The IFFT P103 transforms the signal in the frequency domain into a signal in the time domain by the inverse FFT operation. The IFFT P103 is executed by the IFFT part 114 shown in FIG. 1.

The Tx processing in time domain P104 is signal processing in the time domain such as addition of CP (cyclic prefix). The Tx processing in time domain P104 is executed by the CP addition part 115 shown in FIG. 1.

The down-sampling P105 is a signal frequency transforming process for decreasing the signal frequency. The down-sampling P105 is executed by the Tx down-sampling part 116.

The interface control between baseband and radio units P106 transmits the signal whose frequency has been transformed into the smaller frequency by the down-sampling P105 between the units. That is, the signal whose frequency has been transformed into the smaller frequency by the down-sampling P105 is transmitted from the baseband unit 100 shown in FIG. 1 to the remote radio unit 150.

In the signal transmission between the units in the interface control between baseband and radio units P106, it is not always necessary that the output signal of the down-sampling P105 is transmitted without being modulated as it is. For example, serial transmission can be executed by parallel-serial conversion. Also, for example, it is possible that after the output signal of the down-sampling P105 is transformed into an optical signal and transmitted, and the optical signal is returned into an electric signal, the electric signal is input to the up-sampling P107.

The up-sampling P107 is a signal frequency transforming process for increasing the signal frequency that has been decreased in the down-sampling P105, and making the signal frequency equal to the signal frequency that has not yet been transformed by the down-sampling P105. The up-sampling P107 is executed by the Tx up-sampling part 161 shown in FIG. 1.

The radio unit Tx processing P108 is band limiting due to the D/A conversion or filtering, and signal processing in the radio frequency band. The radio unit Tx processing P108 is executed by the Tx bandwidth constraint part 162 and the DAC unit 163.

Figure 9:
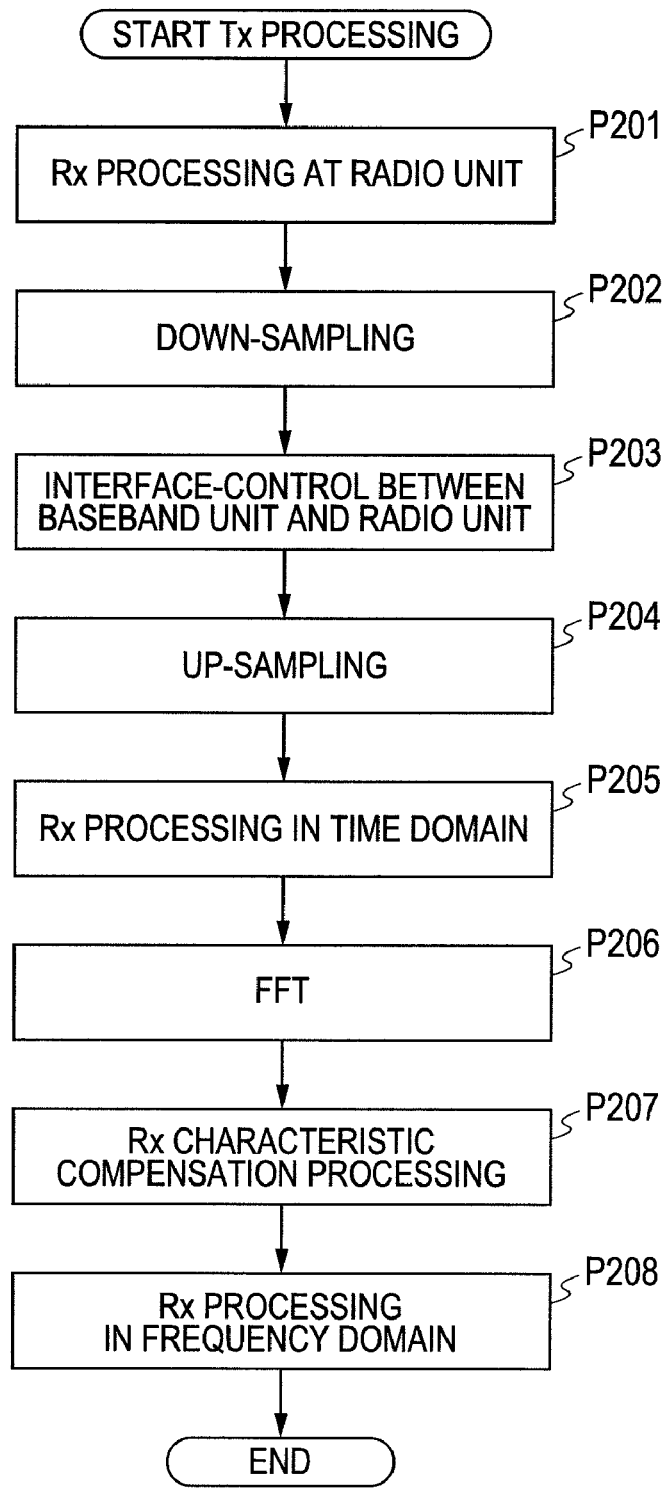
FIG. 9 is a flowchart illustrating an example of Rx signal processing.

FIG. 9 is a flowchart illustrating an example of Rx signal processing according to the present invention. The received signal is processed in the stated order of Rx processing at radio unit P201, down-sampling P202, interface control between baseband and radio units P203, up-sampling P204, Rx processing in time domain P205, FFT P206, Rx characteristic compensation processing P207, and Rx processing in frequency domain P208.

The Rx processing at radio unit P201 is signal processing in the radio frequency band, band limiting due to filtering, and A/D conversion. The Rx processing in time domain P205 is signal processing in the time domain such as acquisition of synchronization timing. The FFT P206 transforms the signal in the time domain into the signal in the frequency domain by FFT operation.

The Rx processing in frequency domain P208 is signal processing such as demodulation or decoding in each of the subcarriers in the frequency domain. Although being called "frequency domain" in this specification, it is unnecessary that all of the processing is conducted strictly in the frequency domain. For example, there can be used an SC-FDMA system that conducts IDFT after subjecting the receive signal in the frequency domain to an equalizing process, and thereafter conducts processing such as demodulation or decoding.

The down-sampling P202, the interface control between baseband and radio units P203, and the up-sampling P204 are the same processing as the down-sampling P105, the interface control between baseband and radio units P106, and the up-sampling P107 with respect to the Tx signal, respectively. The Rx characteristic compensation processing P207 is the same as the Tx characteristic compensating processing P102 with respect to the Tx signal except that not signal that has not yet been transmitted but the signal that has been received is processed.

Figure 10:
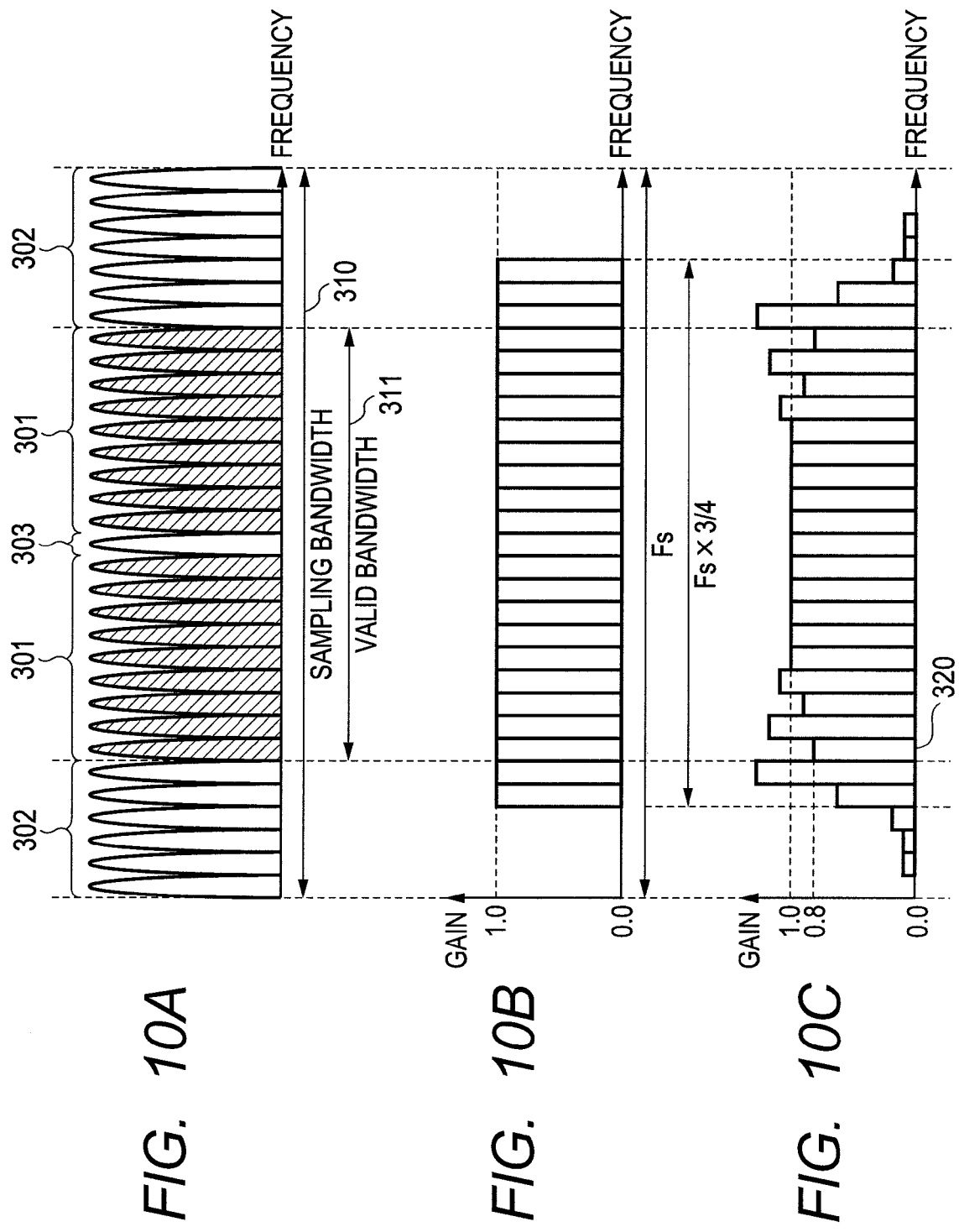
FIGS. 10A to 10C are schematic diagrams illustrating an example of a signal in a frequency domain.

FIGS. 10A to 10C are schematic diagrams illustrating an example of the appearance of a signal in the frequency domain. Referring to FIGS. 10A to 10C, the appearance of the signal will be described together with a relationship with the down-samplings P105 and P202, the up-samplings P107 and P204, the Tx characteristic compensating processing P102, and the Rx characteristic compensation processing P207.

The axis of abscissa in FIGS. 10A to 10C represents the frequency, and in the example of FIGS. 10A to 10C, the frequency range is divided into 32 subcarriers. When the OFDM system is used, a part of the subcarriers is not generally used for transmission. FIG. 10A shows an example in which 18 subcarriers among the entire subcarriers of 32 are used for transmission of the signal as effective subcarriers 301. In this example, a central subcarrier 303 and peripheral subcarriers 302 are not used for transmission of the signal.

In order to conduct 32 IFFT processing in correspondence with the number of subcarriers which is 32, a signal of a frequency corresponding to a sampling frequency 310 is input to the down-sampling P105. Meanwhile, because the signal input to the down-sampling P105 includes only information volume corresponding to a valid bandwidth 311, even if the signal frequency is decreased down to a frequency corresponding to the valid bandwidth 311, no information is lost. For that reason, the down-sampling P105 can conduct down-sampling even at any sampling ratio if the sampling ratio is larger than a ratio of the sampling bandwidth 310 and the valid bandwidth 311. In the following description, a case in which downsampling is conducted at 4:3 by the down-sampling P105 will be exemplified.

For example, when it is assumed that the signal frequency before the down-sampling P105 is Fs, the frequency of a signal that passes through the interface control between baseband and radio units P106 of the down-sampling P105 is Fs×¾. The up-sampling P107 up-samples the input signal of the frequency Fs×¾ to $\frac{4}{3}$ times, and outputs the signal at the same signal frequency Fs as that before the down-sampling P105.

FIG. 10B shows a frequency characteristic when no strain occurs in the signal at all due to the processing of the down-sampling P105 and the up-sampling P107. In this case, the signal in the frequency range of Fs×¾ is 1 in gain, that is, the signal is not changed. However, in general, the signal is strained.

FIG. 10C shows an example of the frequency characteristic when a strain occurs in the signal due to the down-sampling P105 and the up-sampling P107. As shown in FIG. 10C, a different gain occurs in each of the subcarriers. For example, a subcarrier indicated by reference numeral 320 has the gain of 0.8, that is, the signal increases 0.8 times. When the frequency characteristic occurs as shown in FIG. 10C, in the Tx characteristic compensating processing P102, the signal of each subcarrier is multiplied by the inverse number of the gain in each frequency. Because, for example, the subcarrier indicated by reference numeral 320 has the gain of 0.8 by the down-sampling P105 and the up-sampling P107, the signal increases 1/0.8 times in the Tx characteristic compensating processing P102 in advance. The strain of the signal viewed in the frequency domain is canceled by the combination of the down-sampling P105, the up-sampling P107, and the Tx characteristic compensating processing P102.

When the signal is viewed in the time domain, there remains an influence in which the signal is blurred in the time direction due to influences of the down-sampling P105 and the up-sampling processing P107. However, because the blur of the signal in the time direction is absorbed by a mechanism (for example, CP) for removing the multipath effect in the radio section, no problem arises.

In this example, the inverse number of the gain in each frequency in the down-sampling P105 and the up-sampling P107 is multiplied in the Tx characteristic compensating processing P102. However, it is not always necessary that a value multiplied in the Tx characteristic compensating processing P102 coincides with the inverse number of the gain in each frequency. When the value multiplied by the Tx characteristic compensating processing P102 has a value having a negative correlation with the gain in each frequency of the down-sampling P105 and the up-sampling P107, a given effect can be obtained.

For example, in the Tx characteristic compensating processing P102, a value obtained by quantizing the inverse number of the gain in each frequency at several levels can be multiplied. Alternatively, there can be applied a process in Which given threshold values T0 and T1 are provided, and when the gain in each frequency is equal to or larger than T0, a coefficient C0 is multiplied, and when the gain in each frequency is equal, to or smaller than T1, a coefficient C1 is multiplied.

The configuration of a radio station according to a second embodiment will be described with reference to the accompanying drawings.

Figure 11:
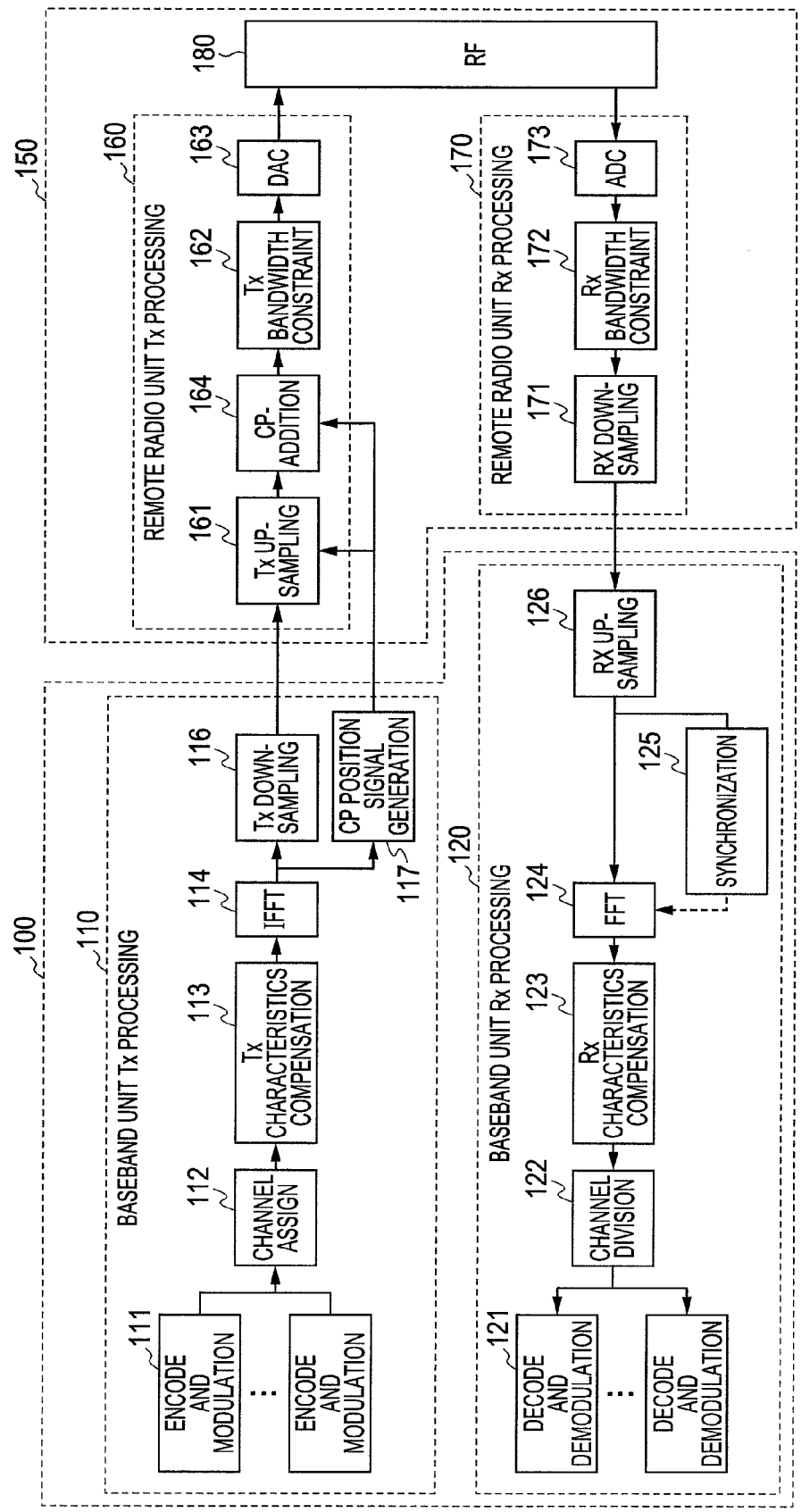
FIG. 11 is a block diagram illustrating another example of signal processing in a radio station.

FIG. 11 is a block diagram illustrating signal processing in a radio station according to this embodiment.

The baseband unit Rx processing part 120, the remote radio unit Rx processing part 170, and the RF unit 180 are identical with those in FIG. 1.

The configuration of the baseband unit Tx processing part 110 shown in FIG. 11 is different from that in FIG. 1 in that the CP adding unit 115 is eliminated, and a CP-position signal generation part 117 is provided. Other portions in FIG. 11 are identical with those in FIG. 1. That is, the encode and modulation part 111, the channel assignment part 112, and the Tx characteristic compensation part 113 are identical with those of the first embodiment shown in FIG. 1. Instead of the CP addition part 115 provided in the IFFT part 114 of FIG. 1, a signal is output to the Tx down-sampling part 116 and the CP-position signal generation part 117 in FIG. 11. Also, the second embodiment is different from the first embodiment in that, instead of the CP addition part 115 provided in the Tx down-sampling part 116 in FIG. 1, the signal is received from the IFFT part 114 in FIG. 11. Further, the second embodiment is different from the first embodiment in that the signal received from the IFFT part 114 is down-sampled as a periodic signal that circulates every IFFT processing unit.

The CP-position signal generation part 117 produces an indicator indicative of the separation of the IFFT processing unit, and notifies the Tx up-sampling part 161 and a CP addition part 164 within the remote radio unit Tx processing part of the indicator. The indicator is, for example, a signal representative of the head of the IFFT output unit in FIG. 5.

The configuration of the remote radio unit Tx processing part 160 is identical with those in the first embodiment except that the CP addition part 164 is provided. That is, the DAC unit is identical with that in the first embodiment. The Tx bandwidth constraint part 162 is identical with that in the first embodiment except that the Tx bandwidth constraint part 162 receives the signal from the CP addition part 164 instead of the Tx up-sampling part 161.

The Tx up-sampling part 161 is identical with that in the first embodiment except that the Tx up-sampling part 161 outputs the signal to the CP addition part 164 instead of the Tx bandwidth constraint part 162. Also, the Tx up-sampling part 161 is identical with that in the first embodiment except that the Tx up-sampling part 161 regards the signal received as an input signal to the remote radio unit Tx processing part 160 as a periodic signal that circulates in each separation of the IFFT processing units on the basis of the indicators notified from the CP-position signal generation part 117, and conducts the upsampling process.

Figure 5:
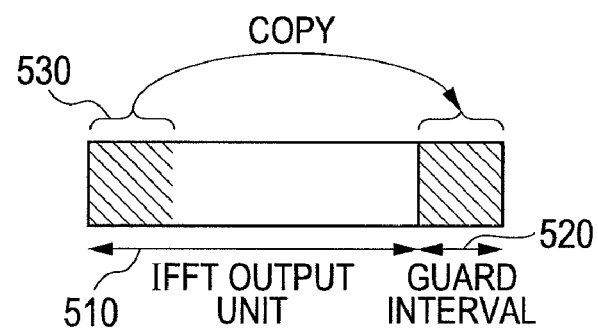
FIG. 5 is a schematic diagram illustrating a CP adding process.

The CP addition part 164 copies a part of the output of the Tx up-sampling part 161 on the basis of the indicators received from the CP-position signal generation part 117, adds a CP shown in FIG. 5, and outputs the result to the Tx bandwidth constraint part 162.

In the above configuration diagram, the description has been made in each block of the signal processing. However, it is unnecessary that each block has the independent substance in fact, and the operation of each block can be realized by using a general-purpose processing module.

Figure 12:
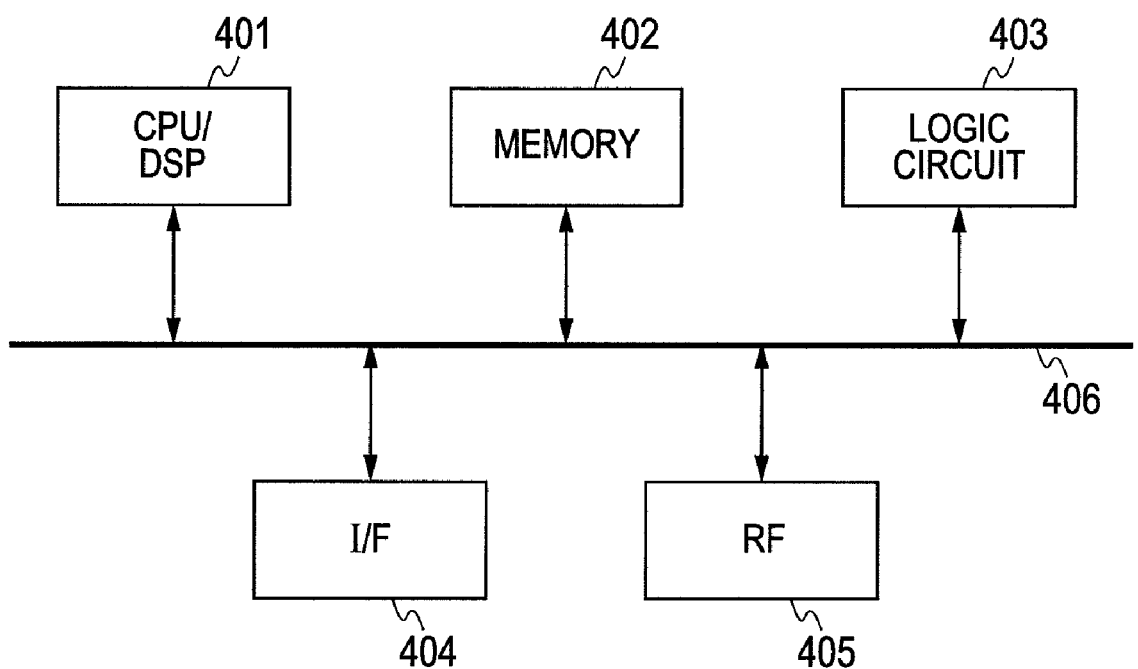
FIG. 12 is a configuration diagram illustrating a transmitting device/receiving device mainly including a CPU and a DSP.

For example, FIG. 12 is a schematic diagram illustrating a transmitting device/receiving device mainly including a CPU and a DSP. A block 401 is a CPU/DSP module which controls signal processing operation and signal processing shown in the above respective embodiments. A block 402 is a memory module which retains the transmit signal and the receive signal which are during processing and before and after processing, and a table used for signal processing. A block 403 is a logic circuit module which controls the signal processing operation and the signal processing shown in the above respective embodiments as with the CPU/DSP 401. A block 404 is an interface module that inputs and outputs the control signal, the transmit signal that has not yet been subjected to the signal processing, and the receive signal that has been subjected to the signal processing. A block 405 is an RF module that transforms the transmit signal into a signal of the radio frequency band and transmits the signal through an antenna, and transforms the receive signal that has been received through the antenna into a signal of the baseband. A bus 406 connects the above respective modules to each other.

The signal processing operation and the signal processing in the respective processing blocks according to the first and second embodiments are controlled by means of one or both of a program in the CPU/DSP module 401 and an arithmetic circuit in the logic circuit module 403, and if occasion demands, the memory module 402.

FIG. 11 is the simplest mounted example showing the respective modules one by one. However, it is unnecessary that each module and the bus are single. For example, a plurality of the CPU/DSP modules 401 can be provided, and a plurality of the buses 406 can be provided. When the plurality of buses 406 is provided, it is not always necessary that all of the buses are connected to all of the modules. For example, in addition to the buses that are connected to all of the modules, a bus that connects only the memory module 402 and the logic circuit module 403 can be provided.

The above-mentioned embodiments of the present invention can be applied to various multicarrier communication methods and various modulation methods.

What is claimed is:

1. A signal processing method for, on communicating between transmit and receive stations using a plurality of subcarriers and, at the transmit station, generating a transmit signal on the time axis from a signal in each of the subcarriers by orthogonal transform, comprising the steps of:
performing first frequency transform processing that decreases a frequency of the signal on the time axis;
performing second frequency transform processing that increases the frequency of the transmit signal that has been subjected to the first frequency transform; and
conducting characteristic compensation of the first frequency transform processing and the second frequency transform processing for the signal in each subcarrier based on the inverse transform results of the orthogonal transform to impulse responses of the first frequency transform processing and the second frequency transform processing.

2. The signal processing method according to claim 1, wherein the step of conducting characteristic compensation for each subcarrier is to multiply the inverse number of the inverse transform results.

3. The signal processing method according to claim 1, wherein the orthogonal transform is an inverse Fourier transform.

4. A transmitting device that generating a transmit signal to be transmitted to a receiving device, comprising:
a radio transmit unit that transmits the transmit signal; and
a baseband unit to be connected to the radio transmit unit;
wherein the baseband unit includes an orthogonal transform part that orthogonally transforms a signal in each subcarrier to generate a transmit signal; and a first frequency transform part that decreases a frequency of the orthogonally transformed signal on the time axis,
wherein the radio transmit unit includes a second frequency transform part that receives the signal frequency decreased by the first frequency transform part and increases the signal frequency, and
wherein the baseband unit further includes a characteristic compensation part that conducts characteristic compensation of the first frequency transform processing and the second frequency transform processing for the signal in each subcarrier based on the inverse transform results of the orthogonal transform to impulse responses of the first frequency transform processing and the second frequency transform processing.

5. The transmitting device according to claim 4, wherein the characteristic compensation is to multiply the inverse number of the inverse transform results.

6. The transmitting device according to claim 4, wherein the orthogonal transform is an inverse Fourier transform.

7. The transmitting device according to claim 4, wherein the baseband unit further includes a CP addition part that copies and adds a part of the signal that has been subjected to the orthogonal transform.

8. The transmitting device according to claim 4,
wherein the first frequency transform part regards the signal that has been subjected to orthogonal transform as a periodic signal every orthogonal transform unit to conduct frequency transform,
wherein the baseband unit notifies the radio transmit unit of positional information indicative of the orthogonal transform part, and
wherein the second frequency transform part regards the signal that has been subjected to the orthogonal transform as a periodic signal every orthogonal transform unit on the basis of the notified positional information to conduct the frequency transform.

9. The transmitting device according to claim 8, wherein the radio transmit unit includes a CP addition part that copies and adds a part of the signal that has been subjected to the second frequency transform.

10. A receiving device that communicates with a transmitting device via a radio network, comprising:
a baseband receive unit; and
a radio receive unit to be connected to the baseband receive unit,
wherein the radio receive unit includes a third frequency transform part that decreases the frequency of a received signal,
wherein the baseband receive unit includes:
a fourth frequency transform part that increases the frequency of the signal received via the third frequency transform part;
an orthogonal transform part that transforms the signal whose frequency has been increased by the fourth frequency transform part; and
a characteristic compensation part that conducts characteristic compensation on a signal that has been subjected to orthogonal transform in the orthogonal transform part based on the inverse transform results of the orthogonal transform to impulse responses of the third frequency transform part and the fourth frequency transform part.

11. The receiving device according to claim 10,
wherein the characteristic compensation is to multiply the inverse number of the inverse transform results.

12. The receiving device according to claim 10, wherein the orthogonal transform is an inverse Fourier transform.

13. The receiving device according to claim 10, wherein the baseband receive unit further includes:
a synchronization part that detects signal timing for conducting the orthogonal transform from the receive signal, and adjusts the detected signal timing according to the spread of the signal in the third frequency transform part and the fourth frequency transform part.

* * * * *